United States Patent
Giehl

(10) Patent No.: US 11,868,087 B2
(45) Date of Patent: Jan. 9, 2024

(54) METHOD AND DEVICE FOR PRODUCING A COMPUTER-GENERATED HOLOGRAM, HOLOGRAM, AND LIGHTING DEVICE FOR A VEHICLE

(71) Applicant: Hella GmbH & Co. KGaA, Lippstadt (DE)

(72) Inventor: Markus Giehl, Jena (DE)

(73) Assignee: Hella GmbH & CO KGAA, Lippstadt (DE)

( * ) Notice: Subject to any disclaimer, the term of this patent is extended or adjusted under 35 U.S.C. 154(b) by 178 days.

(21) Appl. No.: 17/499,344

(22) Filed: Oct. 12, 2021

(65) Prior Publication Data

US 2022/0026850 A1    Jan. 27, 2022

Related U.S. Application Data

(63) Continuation of application No. PCT/EP2020/057754, filed on Mar. 20, 2020.

(30) Foreign Application Priority Data

Apr. 10, 2019  (DE) ...................... 10 2019 109 437.2

(51) Int. Cl.
  *G03H 1/26* (2006.01)
  *F21S 41/16* (2018.01)
  (Continued)

(52) U.S. Cl.
  CPC ................ *G03H 1/26* (2013.01); *F21S 41/16* (2018.01); *F21S 41/285* (2018.01); *G03H 1/02* (2013.01);
  (Continued)

(58) Field of Classification Search
  None
  See application file for complete search history.

(56) References Cited

U.S. PATENT DOCUMENTS 7,324,248 B2   1/2008  Brotherton-Ratcliffe et al.
9,104,176 B2   8/2015  Dausmann et al.
(Continued)

FOREIGN PATENT DOCUMENTS

DE   102007025907 A1   12/2008
DE   102016107210 A1   10/2017

OTHER PUBLICATIONS

International Search Report dated Jul. 1, 2020 in corresponding application PCT/EP2020/057754.

(Continued)

*Primary Examiner* — Jennifer D. Carruth
(74) *Attorney, Agent, or Firm* — Muncy, Geissler, Olds & Lowe, P.C.

(57) ABSTRACT

A method for producing a computer-generated hologram including producing a reference beam, producing an object beam, applying computer-generated information regarding the hologram to the object beam, overlapping the object beam and the reference beam on or in a light-sensitive recording medium in order to apply the hologram by exposure, wherein several portions of the light-sensitive recording medium are exposed, one after the other, to the object beam and the reference beam simultaneously in order to produce a plurality of sub-holograms, wherein the angle of incidence at which the reference beam hits the surface of a first portion of the recording medium is different from the angle of incidence at which the reference beam hits the surface of a second portion of the recording medium. A change in the angle of incidence of the reference beam is achieved by changing the point of incidence of the reference beam on a lens.

19 Claims, 3 Drawing Sheets

(51) Int. Cl.
*F21S 41/20* (2018.01)
*G03H 1/02* (2006.01)
(52) U.S. Cl.
CPC ......... *G03H 1/265* (2013.01); *G03H 2270/21* (2013.01)

(56) References Cited

U.S. PATENT DOCUMENTS

2007/0206255 A1    9/2007  Yamakage et al.
2011/0063289 A1*   3/2011  Gantz ..................... G03H 1/02
                                                    345/419

OTHER PUBLICATIONS

Curtis et al.; "3.4 Monocular Architecture", in Holographic Data Storage Jan. 1, 2010 ISBN 978-0-470-74962-3.
Kihara et al.; "Personalized Hologram" IS&T's 2001 Pics Conference Proceedings Jan. 1, 2001.

* cited by examiner

METHOD AND DEVICE FOR PRODUCING A COMPUTER-GENERATED HOLOGRAM, HOLOGRAM, AND LIGHTING DEVICE FOR A VEHICLE

This nonprovisional application is a continuation of International Application No. PCT/EP2020/057754, which was filed on Mar. 20, 2020, and which claims priority to German Patent Application No. 10 2019 109 437.2, which was filed in Germany on Apr. 10, 2019, and which are both herein incorporated by reference.

BACKGROUND OF THE INVENTION

Field of the Invention

The present invention relates to a method for producing a computer-generated hologram, a device for producing a computer-generated hologram, a hologram produced by such a method and/or produced with such a device, and a lighting device for a vehicle having such a hologram.

Description of the Background Art

A method, a device, a hologram, and a lighting device of the type mentioned above are known from DE 10 2016 107 210 A1, which is incorporated herein by reference. In the method described therein, a hologram consisting of a plurality of sub-holograms is applied by exposure into a light-sensitive recording medium. The portions of the recording medium corresponding to the individual sub-holograms are successively exposed to an object beam and a reference beam. The object beam is modulated by a light modulator with computer-generated hologram information. The hologram or a hologram replica produced using the hologram as a master hologram can be integrated into a headlight of a motor vehicle.

In the production of holograms, the characteristics of the light source used for reconstruction play a crucial role. A change in the characteristics, such as divergence, of a light source used to reconstruct the hologram compared to the light source used in the manufacturing process results in strong changes in the reconstructed image. The same applies to changing the substrate geometry on which the hologram is applied. Devices for manufacturing computer-generated holograms are usually limited to simple substrate shapes. Free-form substrates are only possible to a limited extent or not at all. In the state of the art, computer-generated holograms or sub-holograms included in those are not optimized in their reconstruction angle to the radiation characteristics of different light sources, and methods for their production are limited to either transmission, reflection, or edge-lit holograms.

SUMMARY OF THE INVENTION

It is therefore an object of the present invention to provide a method and a device of the kind mentioned above, which, when producing a hologram, can take into account properties of a light source used to reconstruct the hologram and/or the geometry of a substrate to which the hologram is to be applied. Furthermore, a hologram produced by such a method and/or produced with such a device, as well as a lighting device for a vehicle with such a hologram are to be disclosed.

According to an exemplary embodiment, it is provided that the angle of incidence at which the reference beam hits the surface of a first portion of the recording medium is different from the angle of incidence at which the reference beam hits the surface of a second portion of the recording medium, wherein the change in the angle of incidence of the reference beam is achieved by changing the point of incidence of the reference beam on a lens through which the reference beam passes on the way to the light-sensitive recording medium. In this way, different sub-holograms with different incident angles of the reference beam can be read, so that characteristics of a light source used to reconstruct the hologram and/or the geometry of a substrate can be taken into account when writing the hologram. For example, depending on the divergence of the light source used for the reconstruction or on the curvature of the substrate to which the hologram is to be applied, different angles of incidence of the reference beam can be selected for different sub-holograms. It may be possible to adjust the angle between the reference and object beams almost continuously for each sub-hologram, thus creating the prerequisite for curved substrates and making it possible to adapt to different radiation characteristics of diverse light sources. By changing the point of incidence of the reference beam on the lens, the angle of incidence of the reference beam on the recording medium can be changed by simple means.

For example, different angles of incidence of the reference beam on the surfaces of the portions of the recording medium can be produced by different radial distances between the optical axis of the lens and the point of incidence of the reference beam on the lens. To this end, the reference beam can hit the lens parallel to the optical axis of the lens.

It is possible for the light-sensitive recording medium to have a flat surface. Nevertheless, it can be achieved by the method according to the invention that the hologram can be reconstructed after being applied to a curved substrate.

It can be provided that the light-sensitive recording medium is moved between an exposure with the object beam and the reference beam to produce a first sub-hologram and an exposure with the object beam and the reference beam to produce a second sub-hologram, in particular in a plane parallel to the flat surface of the recording medium. In this way, individual sub-holograms can be written one after the other.

In this case, the optical axis of the lens may be oriented perpendicular to the plane in which the light-sensitive recording medium is moved between producing two sub-holograms.

The produced computer-generated hologram can be a transmission hologram or a reflection hologram or an edge-lit hologram. In this case, it is possible to produce both transmission, reflection, and edge-lit holograms with a single setup.

It may be provided that the produced computer-generated hologram serves as a master hologram for the production of hologram replicas. For example, the hologram replicas can be read into a thin flexible film. This film can then be applied, for example, to a curved surface of a lighting device, in particular a headlight.

The optics serving for overlapping the object beam and the reference beam are configured such that the angle of incidence at which the reference beam hits the surface of a first portion of the recording medium is different from the angle of incidence at which the reference beam hits the surface of a second portion of the recording medium, wherein the optics serving for overlapping the object beam and the reference beam comprises at least one lens through which the reference beam can pass on the way to the light-sensitive recording medium, and wherein the change in the angle of incidence of the reference beam is achieved by changing the point of incidence of the reference beam on the at least one lens. The device permits flexible production of holograms that can be adapted for application to curved substrates as well as to light sources that emit light at will.

It can be provided that the device is suitable for carrying out a method according to the invention.

It is possible that the device comprises at least one lens on opposite sides of the light-sensitive recording medium, through which the reference beam can pass on the way to the light-sensitive recording medium, wherein the change in the angle of incidence of the reference beam is achieved by changing the point of incidence of the reference beam on one of the lenses. In this way, the reference beam can optionally hit the light-sensitive recording medium from the same side as the object beam or from the side opposite the object beam. This makes it possible to produce both transmission holograms and reflection holograms.

It can be provided that the at least one lens is part of a lens system, in particular consisting of two or more lenses, through which the reference beam can pass on the way to the light-sensitive recording medium. By using a lens system consisting of more than one lens, the lens on whose surface the changeable point of incidence of the reference beam is arranged can be made simpler.

It is possible that the device comprises an immersion agent, for example an immersion liquid, which is arranged between the at least one lens or a lens of the lens system and the light-sensitive recording medium or a substrate carrying the light-sensitive recording medium. By using an immersion agent, the angle between the optical axis of the lens and the reference beam can be selected so large that the angle of incidence of the reference beam on the light-sensitive recording medium or on the substrate carrying the recording medium lies in the range of the critical angle of total internal reflection. This makes it possible to produce edge-lit holograms.

It can be provided that the device comprises a telescope with which the extension of the reference beam can be changed, in particular reduced. By reducing the extension of the reference beam, the change in the angle of incidence of the reference beam on the light-sensitive recording medium is easier to control.

It may be provided that the device comprises movement components for moving the light-sensitive recording medium between an exposure with the object beam and the reference beam for producing a first sub-hologram and an exposure with the object beam and the reference beam for producing a second sub-hologram, wherein the movement components are capable of moving the recording medium in particular in a plane parallel to the flat surface of the recording medium.

It is possible that the modulator for imprinting information relating to the hologram on the object beam is in the form of an LC display, preferably an LC display operated in a reflection arrangement, which can produce phase offsets between different sections of the object beam.

The hologram, in particular the hologram replica, is produced by a method according to the invention and/or with a device according to the invention, wherein the hologram is in particular provided for application to a curved surface and/or for use with a light source having a predetermined divergence.

The lighting device for a vehicle, in particular the headlight for a vehicle, comprises a hologram according to the invention, wherein the lighting device in particular comprises a curved surface on which the hologram is arranged.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitive of the present invention, and wherein.

DETAILED DESCRIPTION

Figure 1:
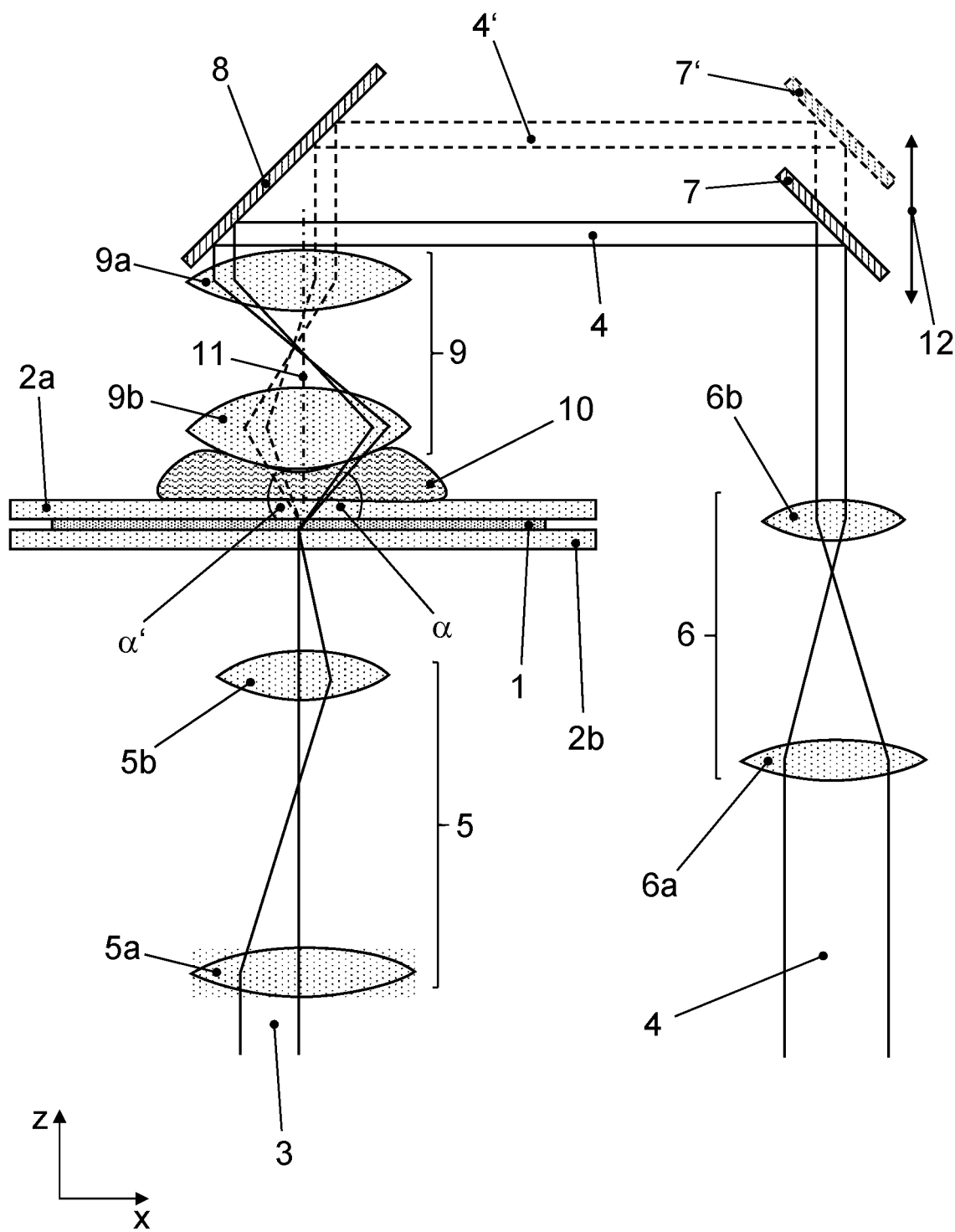
FIG. 1 is a side view of a portion of an exemplary embodiment of a device according to the invention.

In the figures, identical and functionally identical parts are given the same reference signs. Furthermore, FIG. 1 and FIG. 2 each show a Cartesian coordinate system in which the y-direction extends into the drawing plane.

In the example shown in FIG. 1, a hologram consisting of a plurality of sub-holograms is to be imaged into a light-sensitive recording medium 1. The sub-holograms can be arranged side by side in a two-dimensional matrix in an x- and a y-direction. Common materials used in the creation of holograms can be considered as the light-sensitive recording medium 1.

For example, the recording medium 1 may be formed as a film disposed on a transparent substrate. In the illustrated embodiments, a substrate 2a, 2b is provided on both the upper surface and the lower surface of the light-sensitive recording medium 1. The light-sensitive recording medium 1 has a flat surface and extends in an x-y plane.

The first embodiment of a device according to the invention, shown schematically in part in FIG. 1, further comprises a laser light source, not shown, which produces a laser beam which is split by optics, also not shown, into an object beam 3 and a reference beam 4. The device further comprises non-illustrated modulator, which can, for example, be embodied as an LC display in a reflection arrangement. The LC display can be controlled in dependence on computer-generated data concerning the creation of individual sub-holograms.

The object beam 3 can be expanded onto the LC display by optics which are also not shown. Depending on the data driving the LC display, the LC display can change the phase of parts of the object beam 3 during reflection so that parts of the object beam 3 have a phase offset relative to other parts of the object beam 3. This imprints information relating to a sub-hologram to the object beam 3.

The device further comprises a lens system 5 serving as a lens, which consists of two lenses 5a, 5b. The object beam 3 passes through this lens system 5, wherein it is focused by the lens system 5 in FIG. 1 from below or in the positive z-direction into the recording medium 1.

The device according to FIG. 1 further comprises a telescope 6 consisting of two lenses 6a, 6b, through which the reference beam 4 passes and which reduces the extension of the reference beam 4 in the transverse direction. After passing through the telescope 6, the reference beam 4 is deflected by two mirrors 7, 8 each by 90° so that it then runs in the negative z-direction, or downward in FIG. 1.

The device further comprises a lens system 9 serving as a lens, which consists of two lenses 9a, 9b. The reference beam 4 passes through this lens system 9, wherein it is focused by the lens system 9 in FIG. 1 from above or in the negative z-direction into the recording medium 1. An immersion medium 10, for example an immersion liquid, is arranged between the lens 9b of the lens system 9, which is arranged closer to the substrate 2a of the recording medium 1, and the substrate 2a.

In the recording medium 1, the reference beam 4 is superimposed on the object beam 3. By interference of the object beam 3 with the reference beam 4, a hologram is inscribed in the light-sensitive recording medium 1 in a manner known per se. In the embodiment shown in FIG. 1, reflection holograms can be written by the reference beam 4 hitting on the side of the light-sensitive recording medium 1 facing away from the object beam 3.

The reference beam 4 hits the lens 9a parallel to the optical axis 11 of the lens 9a. Depending on the distance of the point of incidence of the reference beam 4 on the lens 9a from the optical axis, there is a more or less large angle of incidence α at which the reference beam 4 hits the surface of the recording medium. It is helpful that the reference beam 4 has a small extension in the transverse direction because it passes through the telescope 6.

The first of the two mirrors 7, 8 can be moved along the arrow 12 in the z-direction and into the drawing plane of FIG. 1 and out of the drawing plane in the y-direction, respectively, so that the entire solid angle can be changed. The displacement in the z-direction changes the angle in the x-z-plane and the displacement in the y-direction changes the angle in the z-y-plane.

Different positions of the mirror 7 result in different points of incidence of the reference beam 4 on the lens 9a. FIG. 1 shows two exemplary positions of the mirror 7, 7' and correspondingly two reference beams 4, 4', each of which hit the lens 9a in the negative z-direction and are at a different distance from the optical axis 11 of the lens 9a. Accordingly, the angle α, α' at which they hit the recording medium 1 is also different.

In FIG. 1, the reference beam 4' hitting the lens 9a in the vicinity of the optical axis 11 hits the surface of the recording medium 1 at a comparatively large incident angle α' with respect to the x-y plane. In contrast, the incident angle α, under which the reference beam 4, which in FIG. 1 hits the lens 9a further away from the optical axis 11, hits the surface of the recording medium 1 is significantly smaller than the angle of incidence α'. Changing the position of the reference beam 4, 4' thus results in a change in the angle of incidence α, α' at which the reference beam 4, 4' hits the recording medium 1, and thus also in a change in the orientation of the Bragg planes in the hologram as well as in a change in the angle of incidence at which the hologram can later be reconstructed.

The lens system 9 performs two functions. On the one hand, it serves to focus the reference beam 4, 4' onto or into the recording medium 1 and, on the other hand, it enables the angle of incidence α, α' of the reference beam 4, 4' to be changed. The recording medium 1 is thereby displaceably mounted in an x-y plane in the focal plane of the lens system 9. Suitable movement drive for moving the light-sensitive recording medium 1 are provided for this purpose.

To produce the hologram, the recording medium 1 can be positioned in the x-y plane such that the object beam 3 and the reference beam 4, 4' overlap on a first portion of the surface of the recording medium 1 in order to apply a first sub-hologram by exposure. For this purpose, the information relating to the first sub-hologram is imprinted on the object beam 3.

After reading in the first sub-hologram, the recording medium 1 is shifted in the x-y plane until the object beam 3 and the reference beam 4, 4' overlap on a second portion of the surface of the recording medium 1 in order to apply a second sub-hologram by exposure. For this purpose, the information relating to the second sub-hologram is imprinted on the object beam 3.

In this way, all sub-holograms are gradually read into the recording medium 1.

When the reference beam 4, 4' hits the edge region of the lens 9a, angles of incidence corresponding to the critical angle of total internal reflection at the interface from the substrate 2a to the surroundings can be realized due to the immersion agent 10. In this way, the embodiment according to FIG. 1 can be used to produce reflection edge-lit holograms.

Figure 2:
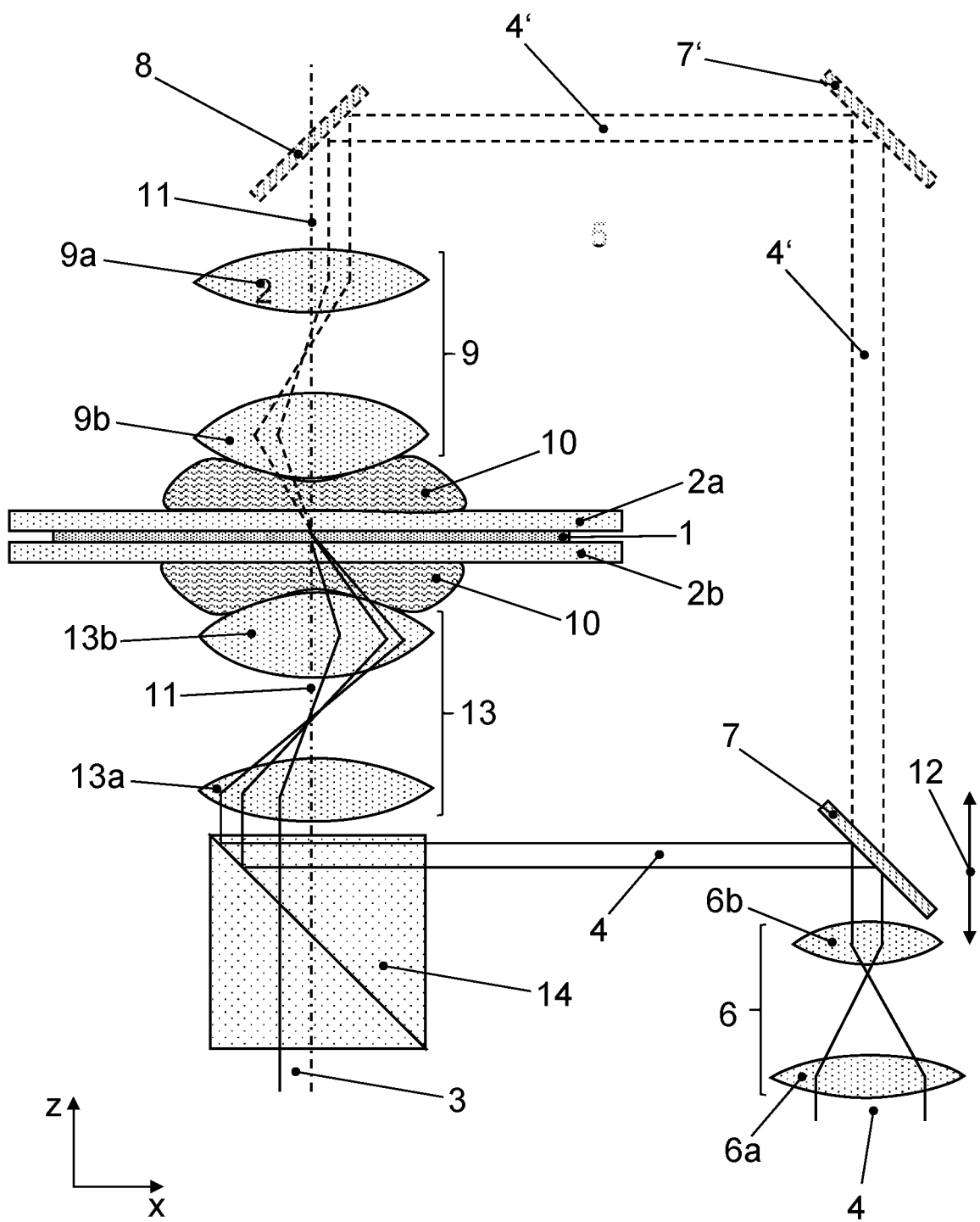
FIG. 2 is a side view of a portion of an exemplary embodiment of a device according to the invention.

The second embodiment of a device according to the invention illustrated in FIG. 2 differs from the first embodiment in particular in that the lens 13 arranged on the underside of the recording medium 1 or on the object beam side is designed like the lens 9 arranged above the recording medium 1. It also has two lenses 13a, 13b, wherein an immersion medium 10, for example an immersion liquid, is arranged between the lens 13b of the lens system 13 arranged closer to the substrate 2b of the recording medium 1 and the substrate 2b.

In this embodiment, both the object beam 3 and the reference beam 4 can pass through the lens system 13. For this purpose, the telescope 6 and the movable mirror 7 are arranged somewhat further down, so that the reference beam 4 emanating from the mirror 7 can be reflected upward onto the lens 13 by a beam splitter serving as a beam combiner 14. Here, too, different positions of the mirror 7 result in different points of incidence of the reference beam 4 on the lens 13a or different distances of the points of incidence of the reference beam 4 from the optical axis 11 of the lens 13a.

The object beam 3 can also pass upward through the beam combiner. The reference beam 4 hitting on the side of the recording medium 1 facing the object beam 3 allows for transmission holograms to be written. In FIG. 2, this corresponds to the superimposition of the object beam 3 with the reference beam 4 hitting the recording medium 1 from below.

When the reference beam 4, 4' hits the edge region of the lens 13a, angles of incidence corresponding to the critical angle of total internal reflection at the interface from the substrate 2b to the surroundings can be realized due to the immersion agent 10. In this way, transmission edge-lit holograms can be produced with the embodiment according to FIG. 2.

In the embodiment shown in FIG. 2, the lens system 9 arranged above the recording medium 1 and the second mirror 8 are also provided. It is therefore possible to use the embodiment shown in FIG. 2 for inscribing reflection holograms after the first mirror 7 has been moved up to the dashed position of the mirror 7', wherein the reference beam 4' corresponds to the beam drawn as a dashed line.

Alternatively, in the second embodiment, the upper lens system 9 and the second mirror 8 can be omitted so that only transmission holograms can then be written with the device.

The flexibility in applying the holograms for exposure at different angles allows for specific adaptation to divergent light sources.

Figure 3:
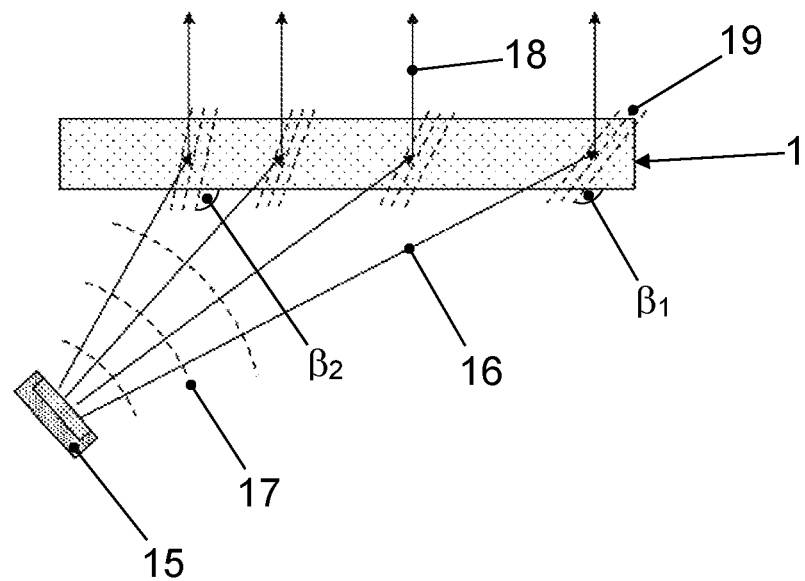
FIG. 3 is a schematic sectional view of an exemplary of a reconstruction of a hologram according to the invention.

FIG. 3 shows as a divergent light source a light-emitting diode (LED) 15 and the light 16 emanating from it, i.e., the wave fronts 17 of the light 16. If, despite the divergence of the light 16, the proportion 18 of the first diffraction order of the hologram reconstructed by the light 16 are to move in the same direction as shown above in FIG. 3, the Bragg planes 19 of the hologram must form a different angle with the surface of the recording medium 1 for different sub-holograms. For example, in FIG. 3, the angle $\beta_1$ of the right Bragg planes 19 is significantly larger than the angle $\beta_2$ of the left Bragg planes 19.

Figure 4:
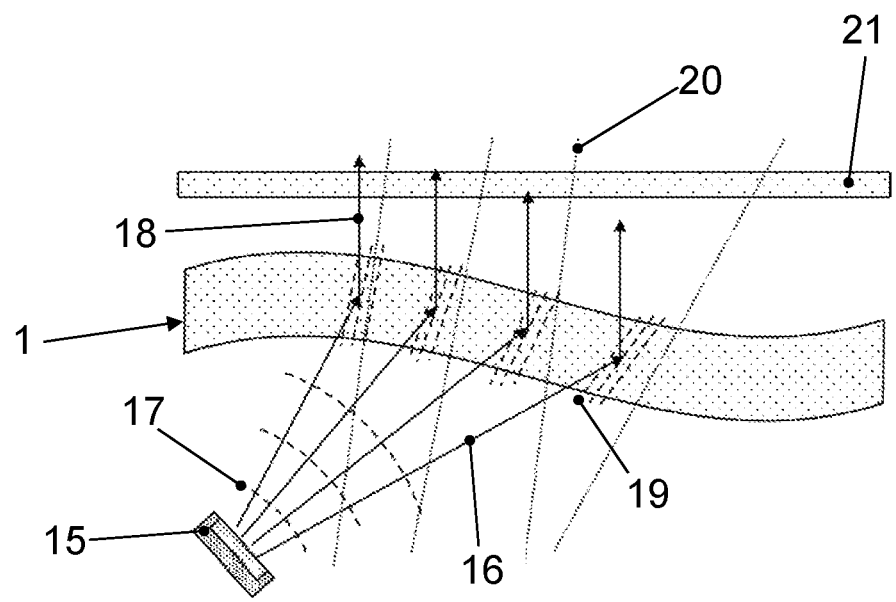
FIG. 4 is a schematic sectional view of an exemplary of a reconstruction of a hologram according to the invention.

It should be noted at this point that in FIG. 3 and FIG. 4, instead of the thin recording medium 1, only a comparatively thick plate is shown. This can be a transparent substrate to which the recording medium 1 is applied, for example in the form of a thin film.

With the devices according to FIG. 1 and FIG. 2 or by the method according to the invention, suitable angles of incidence of the reference beam 4, 4' on the recording medium 1 can be selected during the writing of the hologram into the recording medium 1 in order to achieve suitable inclinations of the Bragg planes 19 in the hologram. The inclination of the Bragg planes 19 suitable for the divergent light source can be taken into account in the production of the computer-generated hologram without having to use the light-emitting diode 15 itself in the writing process.

In the example of a reconstruction according to FIG. 4, a light-emitting diode 15 is also used as a divergent light source. The recording medium 1 or a substrate carrying the recording medium 1 is not flat but curved or has a curved surface.

The Bragg planes 19 of individual sub-holograms, which are already inclined to each other due to the divergent light source, must have an additional slope change due to the curvature of the recording medium 1 containing the hologram. This is illustrated in FIG. 4 by the effective Bragg planes 20, which reflect the change in the Bragg planes due to the curvature of the recording medium 1 serving as the hologram carrier. This angular change, too, of the effective Bragg planes 20, when the recording medium 1 is bent relative to a flat surface 21 drawn as an example in FIG. 4, can already be taken into account in the writing process without having to use a curved recording medium in the writing process.

The computer-generated hologram produced with the devices according to FIG. 1 and FIG. 2 or by the method according to the invention can serve as a master hologram for the production of hologram replicas. The hologram replicas can, for example, be read into a thin flexible film. This film can then be applied, for example, to a curved surface of a lighting device, in particular a headlight.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of producing a computer-generated hologram, the method comprising:
producing a reference beam;
producing an object beam;
applying computer-generated information regarding the hologram to the object beam; and
overlapping the object beam and the reference beam on or in a light-sensitive recording medium in order to apply the hologram by exposure,
wherein several portions of the light-sensitive recording medium are exposed, one after the other, to the object beam and the reference beam substantially simultaneously in order to produce a plurality of sub-holograms,
wherein a first angle of incidence at which the reference beam hits a first portion of a surface of the light-sensitive recording medium is different from a second angle of incidence at which the reference beam hits a second portion of the surface of the light-sensitive recording medium, and
wherein a change between the first and second angles of incidence of the reference beam is achieved by changing a point of incidence of the reference beam on a lens through which the reference beam passes on the way to the light-sensitive recording medium, and
wherein the reference beam passes through an immersion agent or an immersion liquid that is arranged between the lens and the light-sensitive recording medium or a substrate carrying the light-sensitive recording medium.

2. The method according to claim 1, wherein, by changing a radial distance between an optical axis of the lens and the point of incidence of the reference beam on the lens, the different first and second angles of incidence at which the reference beam hits the first and second portions of the surface of the light-sensitive recording medium are produced.

3. The method according to claim 1, wherein the surface of the light-sensitive recording medium is flat.

4. The method according to claim 3, wherein the light-sensitive recording medium is moved between an exposure with the object beam and the reference beam for producing a first sub-hologram at the first portion and an exposure with the object beam and the reference beam for producing a second sub-hologram at the second portion in a plane that is parallel to the flat surface of the light-sensitive recording medium.

5. The method according to claim 4, wherein an optical axis of the lens is oriented substantially perpendicular to the plane in which the light-sensitive recording medium is moved between the production of the first and second sub-holograms.

6. The method according to claim 1, wherein the produced computer-generated hologram is a transmission hologram or a reflection hologram or an edge-lit hologram.

7. The method according to claim 1, wherein the produced computer-generated hologram serves as a master hologram for the production of hologram replicas.

8. A hologram or a hologram replica produced by the method according to claim 1, wherein the hologram or the hologram replica is provided for application to a curved surface and/or for use with a light source having a predetermined divergence.

9. A lighting device for a vehicle comprising the hologram or the hologram replica according to claim 8, wherein the lighting device comprises a curved surface on which the hologram or the hologram replica is arranged.

10. The method according to claim 1, further comprising a mirror that reflects the reference beam, wherein the point of incidence of the reference beam on the lens through which the reference beam passes on the way to the light-sensitive recording medium is changed by moving the mirror along a path that extends parallel to an optical axis of the lens.

11. The method according to claim 10, further comprising a telescope that changes or reduces an extension of the reference beam in a transverse direction, wherein with respect to a beam path of the reference beam, the mirror is positioned between the telescope and the lens.

12. A device for producing a computer-generated hologram, the device comprising:
 a light source for producing a light beam;
 at least one first optics to split the light beam produced by the light source into an object beam and a reference beam;
 a modulator to imprint information relating to the hologram onto the object beam;
 at least one second optics to overlap the object beam and the reference beam on or in a light-sensitive recording medium in order to apply the hologram by exposure, wherein, during operation of the device, a plurality of portions of the light-sensitive recording medium are exposed, one after the other, to the object beam and the reference beam substantially simultaneously in order to form sub-holograms,
 wherein the at least one second optics to overlap the object beam and the reference beam is designed such that a first angle of incidence at which the reference beam hits a first portion of a surface of the light-sensitive recording medium is different from a second angle of incidence at which the reference beam hits a second portion of the surface of the light-sensitive recording medium,
 wherein the at least one second optics to overlap the object beam and the reference beam comprises at least one lens through which the reference beam passes on the way to the light-sensitive recording medium,
 wherein a change between the first and second angles of incidence of the reference beam is achieved by changing a point of incidence of the reference beam on the at least one lens, and
 wherein the device comprises an immersion agent or an immersion liquid arranged between the at least one lens of the at least one second optics and the light-sensitive recording medium or a substrate carrying the light-sensitive recording medium, such that the reference beam passes through the immersion agent or the immersion liquid.

13. The device according to claim 12, wherein the device is adapted to generate a computer-generated hologram.

14. The device according to claim 12, wherein the at least one lens comprises a first lens and a second lens, the first lens being provided on an opposite side of the light-sensitive recording medium as the second lens, wherein the change between the first and second angles of incidence of the reference beam is achieved by changing the point of incidence of the reference beam on one of the first or second lenses.

15. The device according to claim 12, wherein the at least one lens is part of a lens system comprising two or more lenses through which the reference beam passes on the way to the light-sensitive recording medium.

16. The device according to claim 12, wherein the device comprises a telescope to change or reduce an extension of the reference beam in a transverse direction.

17. The device according to claim 16, further comprising a mirror that reflects the reference beam, wherein the point of incidence of the reference beam on the at least one lens through which the reference beam passes on the way to the light-sensitive recording medium is changed by moving the mirror along a path that extends parallel to an optical axis of the lens, wherein with respect to a beam path of the reference beam, the mirror is positioned between the telescope and the at least one lens.

18. The device according to claim 12, wherein the light source is a laser light source.

19. The device according to claim 12, further comprising a mirror that reflects the reference beam, wherein the point of incidence of the reference beam on the at least one lens through which the reference beam passes on the way to the light-sensitive recording medium is changed by moving the mirror along a path that extends parallel to an optical axis of the lens.

* * * * *